US009308946B2

(12) United States Patent
An et al.

(10) Patent No.: US 9,308,946 B2
(45) Date of Patent: Apr. 12, 2016

(54) STRUCTURE FOR COUPLING VEHICLE MEMBERS

(71) Applicant: Kia Motors Corporation, Seoul (KR)

(72) Inventors: Seungwon An, Seoul (KR); Seung Hyun Kang, Hwaseong-si (KR); Seong Woo Choi, Hwaseong-si (KR)

(73) Assignee: Kia Motors Coporation, Seoul (KR)

( * ) Notice: Subject to any disclaimer, the term of this patent is extended or adjusted under 35 U.S.C. 154(b) by 93 days.

(21) Appl. No.: 14/144,338

(22) Filed: Dec. 30, 2013

(65) Prior Publication Data
US 2015/0069777 A1 Mar. 12, 2015

(30) Foreign Application Priority Data

Sep. 11, 2013 (KR) .................. 10-2013-0109071

(51) Int. Cl.
B62D 27/00 (2006.01)
B62D 27/02 (2006.01)
B62D 25/08 (2006.01)

(52) U.S. Cl.
CPC ............ B62D 27/023 (2013.01); B62D 25/082 (2013.01); B62D 25/088 (2013.01)

(58) Field of Classification Search
CPC ... B62D 27/023; B62D 25/082; B62D 25/088
USPC ......... 296/29, 187.1, 187.09, 193.09, 198, 30
See application file for complete search history.

(56) References Cited

U.S. PATENT DOCUMENTS

| 6,572,180 | B2 * | 6/2003 | Kim | 296/203.02 |
| 6,886,818 | B2 * | 5/2005 | Kim | 267/140.13 |
| 7,052,076 | B2 * | 5/2006 | Kim | 296/187.09 |

FOREIGN PATENT DOCUMENTS

| JP | 10-45033 A | 2/1998 |
| JP | 2001-18836 A | 1/2001 |
| KR | 10-2004-0044303 A | 5/2004 |

* cited by examiner

Primary Examiner — Joseph D Pape
Assistant Examiner — Dana Ivey
(74) Attorney, Agent, or Firm — Morgan, Lewis & Bockius LLP

(57) ABSTRACT

A structure for coupling vehicle members is disclosed, wherein in a coupling structure for coupling a front side member having a side inner member and a side outer member to a front fender apron member together, the front fender apron member is coupled to the side outer member together with a fender apron inner panel, the side outer member has a side outer front member and a side outer rear member, and the front fender apron member has a rear side of a bottom end joined the side outer rear member of the front side member, and a lower front extended end portion formed as one unit and joined a side inner member inserted between the side outer front member and the side outer rear member of the front side member.

5 Claims, 4 Drawing Sheets

STRUCTURE FOR COUPLING VEHICLE MEMBERS

CROSS-REFERENCE TO RELATED APPLICATION

The present application claims priority to Korean Patent Application No. 10-2013-0109071 filed on Sep. 11, 2013, the entire contents of which is incorporated herein for all purposes by this reference.

BACKGROUND OF THE INVENTION

1. Field of the Invention

The present invention relates to a structure for coupling vehicle members. More particularly, the present invention relates to a structure for coupling vehicle members which transmit and spread an impact load generated when the vehicle is involved in a small overlap crash at a front side member for preventing an occupant seat from deforming excessively as well as protecting occupants from the crash.

2. Description of Related Art

In general, a vehicle is provided with a structure in which a front side member and a front fender apron are connected for absorbing, transmitting, and spreading an impact load to minimize deformation of a cabin, as well as devise safety of the occupant at the time the vehicle is involved in a small overlap (or side) crash against another vehicle or a fixed body.

In a related art, since the front fender apron member is flange-coupled to a side outer member of the front side member, to cause easy separation of the side outer member from the front fender apron member at the coupled cross-section at the time of the small overlap crash of the vehicle, the structure is poor in transmission and spreading of crash stiffness or the impact load.

Recently, even though a section of the front fender apron member is extended to a lower side to connect the front fender apron member to the side outer member expecting to have an effect of transmission and spreading of the crash stiffness or the impact load, the plug welding of the front fender apron member to a section of the side outer member is easily separated at the time of crash.

Such problems cause transmission of the impact load, not to the front side member, but to a cowl side member and a front pillar to absorb the entire impact load thereby at the time of the small overlap crash of the vehicle, causing a problem in which the occupant seat is excessively deformed, increasing injury of the occupants.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure for coupling vehicle members having advantages of preventing an occupant seat from deforming excessively as well as protecting occupants from a crash. An object of the present invention is to provide a structure for coupling vehicle members in which an extended end portion formed as one unit with a front fender apron member is joined to a side inner member of a front side member to reliably enhance coupling stiffness for transmitting and spreading an impact load generated at the time a vehicle is involved in a small overlap crash to a front side member.

In an aspect of the present invention, in a coupling structure for coupling a front side member having a side inner member and a side outer member to a front fender apron member together, the front fender apron member is coupled to the side outer member together with a fender apron inner panel, wherein the side outer member may include a side outer front member, and a side outer rear member, wherein the front fender apron member may include a rear side of a bottom end joined to the side outer rear member of the front side member, and a lower front extended end portion formed as one unit and joined to a side inner member inserted between the side outer front member and the side outer rear member of the front side member.

The lower front extended end portion may have a fore end joined to at least one of three inside surfaces of the side inner member, which match the fore end.

The joining is made by spot welding or laser welding.

The front fender apron member may include a front side partition wall portion and a rear side partition wall portion, and the lower front extended end portion is formed at a lower end portion of the front side partition wall portion as one unit therewith.

The lower front extended end portion forms a welding flange bent forward along an outer end portion, and the welding flange is welded to the inside surface of the side inner member.

The fender apron inner panel may have an outside surface joined to the front fender apron member, and engine mounting portions formed at both sides of a lower portion thereof welded to an upper surface of the side inner member of the front side member.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
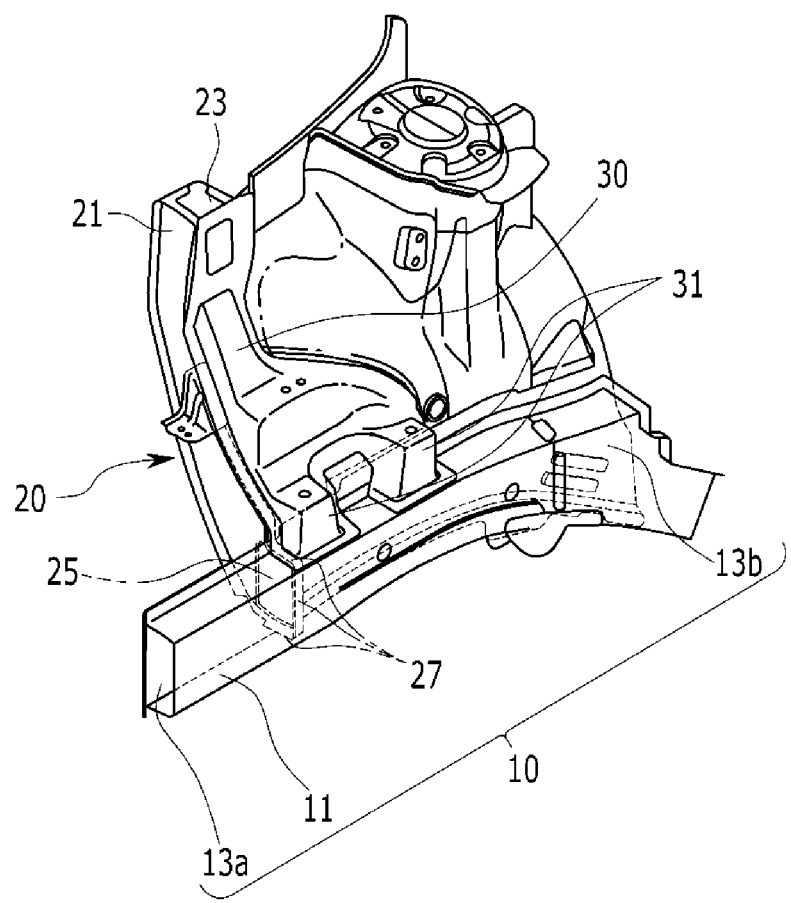
FIG. 1 illustrates a perspective view of a whole structure for coupling vehicle members in accordance with an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereafter, an exemplary embodiment of the present invention will be described with reference to the accompanying drawings.

Since a size and a thickness of each element are shown at will for convenience of description, the present invention is not limited to the drawings without fail, and the thicknesses are enlarged for clearly expressing different parts and regions.

Parts not related to the description of the present invention are omitted for clearly describing an exemplary embodiment of the present invention.

Figure 2:
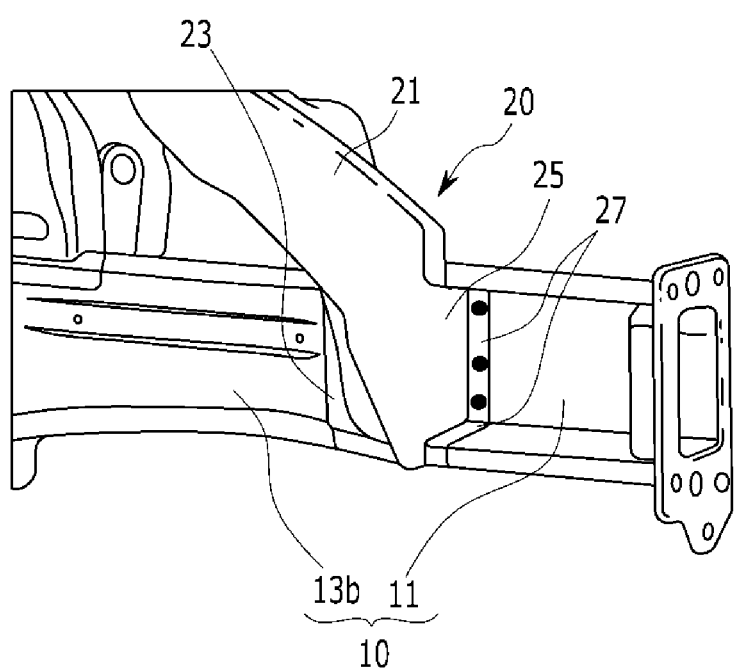
FIG. 2 illustrates a perspective view of a structure for coupling vehicle members in accordance with an exemplary embodiment of the present invention, showing an outer side thereof with a side outer front member removed therefrom.
Figure 3:
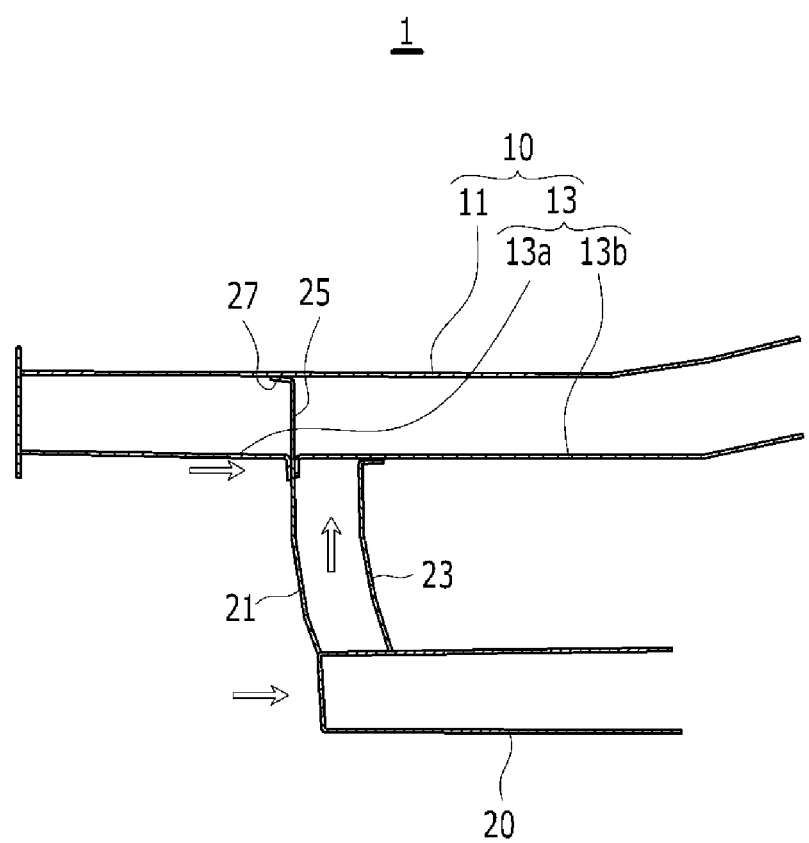
FIG. 3 illustrates a section of a structure for coupling vehicle members in accordance with an exemplary embodiment of the present invention.
Figure 4:
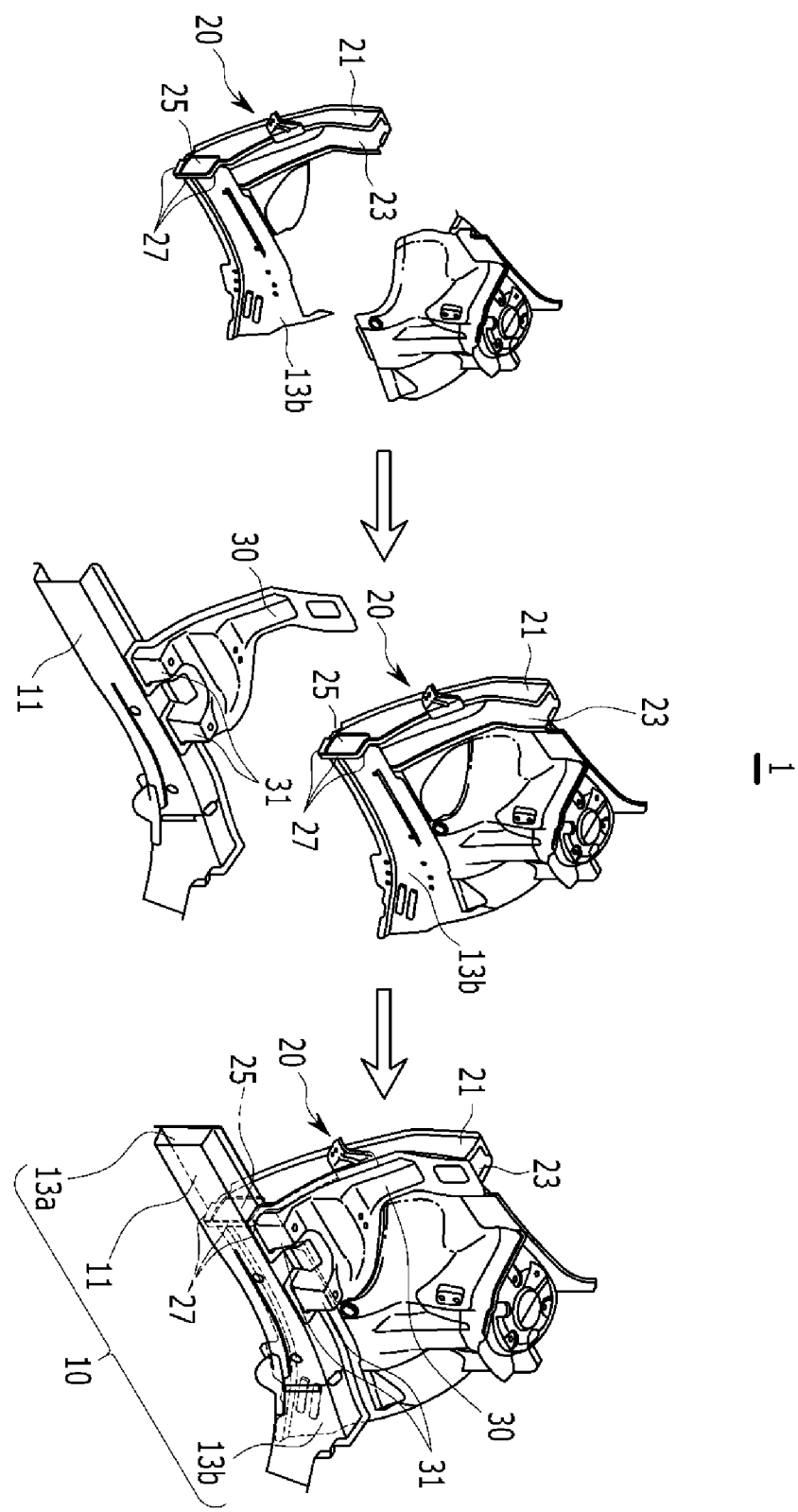
FIG. 4 illustrate the steps of a process for coupling vehicle members in accordance with an exemplary embodiment of the present invention.

FIG. 1 illustrates a perspective view of a whole structure for coupling vehicle members in accordance with an exemplary embodiment of the present invention, FIG. 2 illustrates a perspective view of a structure for coupling vehicle members in accordance with an exemplary embodiment of the present invention, showing an outer side thereof having a side outer front member removed therefrom, FIG. 3 illustrates a section of a structure for coupling vehicle members in accordance with an exemplary embodiment of the present invention, and FIG. 4 illustrate the steps of a process for coupling vehicle members in accordance with an exemplary embodiment of the present invention.

Referring to FIGS. 1 to 4, the structure for coupling vehicle members 1 in accordance with an exemplary embodiment of the present invention relates to a structure for coupling a front side member 10 having a side inner member 11 and a side outer member 13 to a front fender apron member 20.

That is, the structure for coupling vehicle members 1 has a structural characteristic in that an impact load generated when the vehicle is involved in a small overlap crash is transmitted and spread to the front side member 10 for preventing an occupant seat from deforming excessively as well as protecting an occupant from the crash.

The structure for coupling vehicle members 1 couples the front fender apron member 20 to the side outer member 13 together with the fender apron inner panel 30.

In this case, the side outer member 13 includes a side outer front member 13a and a side outer rear member 13b.

In this case, the fender apron inner panel 30 has an outside surface joined to the front fender apron member 20, and engine mounting portions 31 formed at both sides of a lower portion thereof and welded to an upper surface of a side inner member 11 of the front side member 10, respectively.

The front fender apron member 20 has a rear side of a bottom end thereof joined to the side outer rear member 13b of the front side member 10, and a lower front extended end portion 25 formed as one unit and joined to a side inner member 11 inserted between the side outer front member 13a and the side outer rear member 13b of the front side member 10.

That is, the front fender apron member 20 includes a front side partition wall portion 21 and a rear side partition wall portion 23, and the extended end portion 25 is formed at a lower end portion of the front side partition wall portion 21 as one unit therewith.

In this case, the extended end portion 25 may have a fore end joined to at least one of three inside surfaces of the side inner member 11, which match the fore end, by spot welding or laser welding.

According to this, the extended end portion 25 forms a welding flange 27 bent forward along an outer end portion, and the welding flange 27 is welded to the inside surface of the side inner member 11.

As described before, the structure for coupling members of a vehicle 1 in accordance with an exemplary embodiment of the present invention has a structural characteristic of enhanced coupling stiffness by welding the extended end portion 25 formed as one unit with the front fender apron member 20 to the side inner member 11 of the front side member 10 in a state the extended end portion 25 is inserted into the side inner member 11 of the front side member 10.

According to this, the impact load generated when the vehicle is involved in a small overlap crash is securely transmitted and spread to the front side member 10 through the front fender apron member 20.

Owing to this, the excessive deformation of the occupant seat in the related art is prevented, and the occupant can be protected from the crash.

Although one exemplary embodiment of the present invention is described, the present invention is not limited to the exemplary embodiment, but includes all range of changes made by a person skilled in this field of the art from the exemplary embodiment of the present invention and recognized equivalents of the exemplary embodiment.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A coupling structure for coupling a front side member having a side inner member and a side outer member to a front fender apron member together,
   wherein the front fender apron member is coupled to the side outer member together with a fender apron inner panel,
   wherein the side outer member includes:
      a side outer front member; and
      a side outer rear member,
   wherein the front fender apron member includes:
      a rear side of a bottom end joined to the side outer rear member of the front side member; and
      a lower front extended end portion formed as one unit and joined to the side inner member inserted between the side outer front member and the side outer rear member of the front side member, and wherein the front fender apron member includes a front side partition wall portion and a rear side partition wall portion, and the lower front extended end portion is formed at a lower end portion of the front side partition wall portion as one unit therewith.

2. The coupling structure of claim 1, wherein the lower front extended end portion has a fore end joined to at least one of three inside surfaces of the side inner member, which match the fore end.

3. The coupling structure of claim 1, wherein the joining is made by spot welding or laser welding.

4. The coupling structure of claim 1, wherein the lower front extended end portion forms a welding flange bent forward along an outer end portion, and the welding flange is welded to an inside surface of the side inner member.

5. The coupling structure of claim 1, wherein the fender apron inner panel has an outside surface joined to the front fender apron member, and engine mounting portions formed at both sides of a lower portion thereof welded to an upper surface of the side inner member of the front side member.

* * * * *